Oct. 25, 1927.
L. F. BROWN
GEAR LOCK
Filed Nov. 19, 1926
1,647,033
2 Sheets-Sheet 1
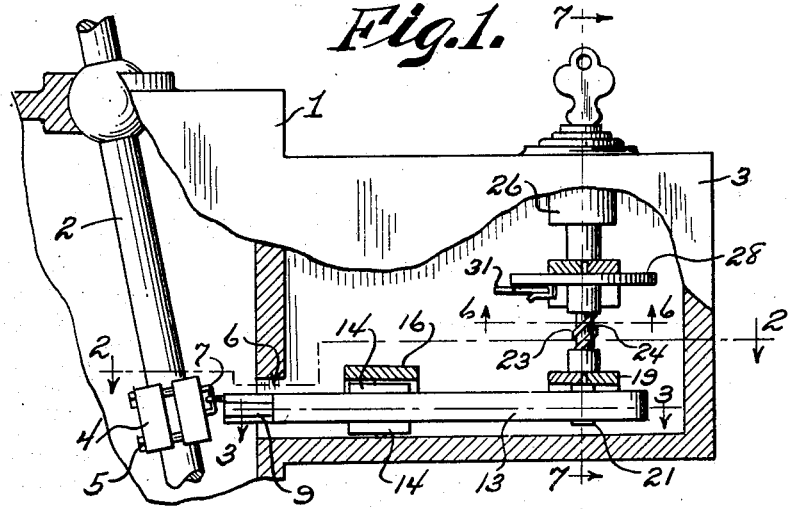
Fig.1.
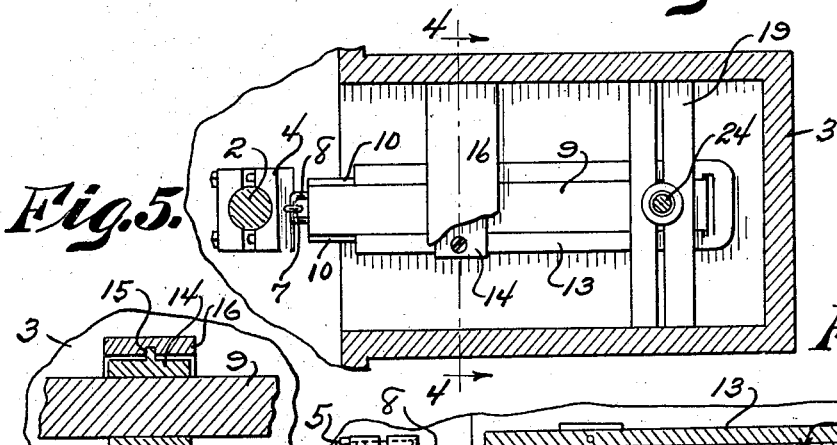
Fig.2. Fig.5. Fig.3.
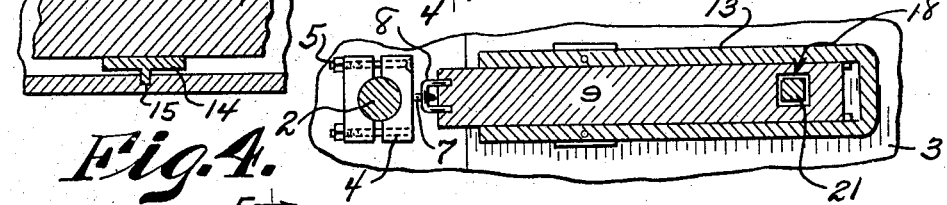
Fig.4.
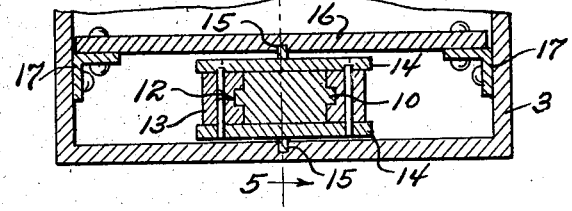
Leeland Francis Brown
INVENTOR
BY Victor J. Evans
ATTORNEY
WITNESS:

Oct. 25, 1927.
L. F. BROWN
1,647,033
GEAR LOCK
Filed Nov. 19, 1926 2 Sheets-Sheet 2
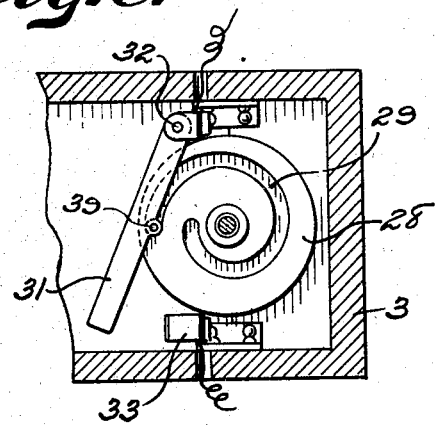
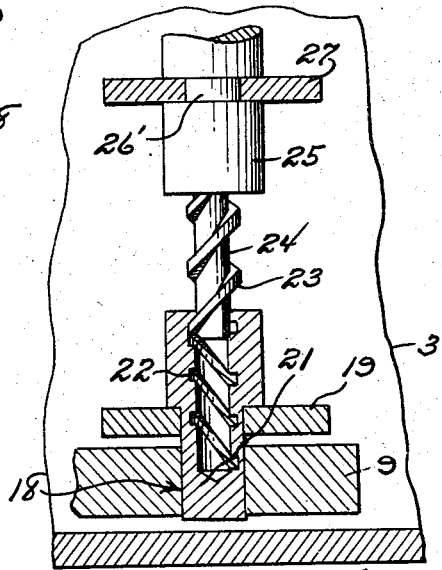
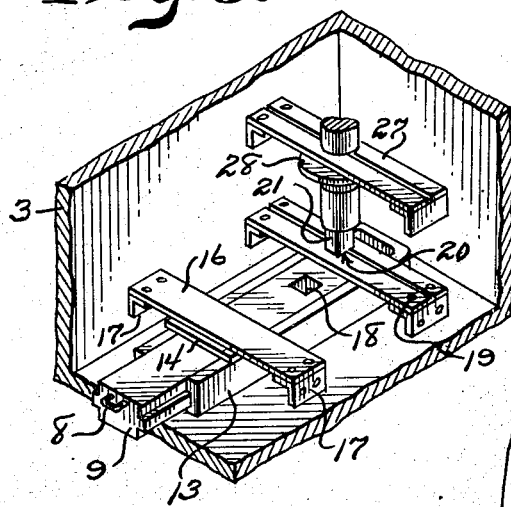
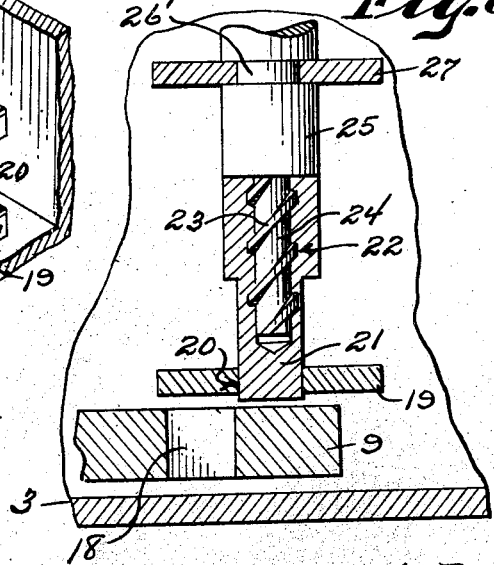
Leeland Francis Brown
INVENTOR Patented Oct. 25, 1927.

1,647,033

UNITED STATES PATENT OFFICE.

LEELAND FRANCIS BROWN, OF KNOXVILLE, TENNESSEE, ASSIGNOR OF ONE-HALF TO KENNETH W. DENNIS, OF KNOXVILLE, TENNESSEE.

GEAR LOCK.

Application filed November 19, 1926. Serial No. 149,470.

An object of this invention is the provision of key operated means for locking the gear shift lever of an automobile in reverse position and at the same time breaking the main battery circuit of the machine, so that the automobile cannot be used by unauthorized persons.

A further object is the provision of an anti-theft locking device for automobiles which may be readily attached to any automobile of the gear shift type.

A still further object is the provision of anti-theft device for automobiles which shall be of a simple construction, involving few simple parts which may be cheaply manufactured, readily associated and easily applied.

To the attainment of the above broadly stated objects and many others which will present themselves as the nature of the improvement is better understood, the invention also resides in certain other novel features of construction, combination and operative association of parts, one satisfactory embodiment of which is illustrated by the accompanying drawings, will be described in detail in the following specification and pointed out with particularity in the appended claims.

In the drawings:

Figure 1 is a side elevation of the improvement, the gear shift lever being locked in reverse position, parts being broken away and parts in section.

Figure 2 is a sectional view on the line 2—2 of Figure 1.

Figure 3 is a sectional view on the line 3—3 of Figure 1.

Figure 4 is a sectional view on the line 4—4 of Figure 2.

Figure 5 is a sectional view on the line 5—5 of Figure 4.

Figure 6 is a sectional view on the line 6—6 of Figure 1.

Figure 7 is a sectional view on the line 7—7 of Figure 1.

Figure 8 is a view substantially similar to Figure 7 but showing the bolt raised to unlocking position.

Figure 9 is a sectional perspective view illustrating a number of important elements of the improvement.

Referring now to the drawings in detail, the numeral 1 designates a portion of a gear shift housing of an automobile, and 2 the gear shift lever. Arranged on one side of the housing 1 there is a hollow box like member 3. This member may be integrally formed with the housing or may be secured thereto in any desired or preferred manner.

I have not deemed it necessary to illustrate the gears which are shifted by the levers 2, but it is to be understood that when the lever is in the position illustrated by Figure 1 of the drawings, the same has been shifted to operate the gears so that the car will travel in a reverse direction.

Fixedly secured on the gear shift lever 2 there is a two-part block or clamp, the sections 4 of which being connected together by bolts 5. One of the sections 4 is disposed opposite an opening 6 that establishes a communication between the box 3 and the gear shift housing 1 and on the outer face of this shift housing there is fixed a substantially block or section 7. The bail 7 is engaged by a U-shaped bail 8 formed or secured on the outer similar bail 8 formed or secured on the outer end of a slidable block 9. The block 9 has its sides formed with outstanding longitudinally extending ribs 10, and these ribs are received in grooves 11 on the inner or confronting sides of a substantially U-shaped guide 13. The guide 13 has its parallel arms, at a desired point throughout the length thereof, connected by upper and lower plates 14, respectively. Each plate 14 has a central outwardly directed pintle 15, the lower pintle being received in a suitable aperture of the box-like member 3 and the upper pintle being received in a bearing notch or opening in a transverse brace plate 16 which has its ends fixed by means 17 to the sides of the box 3.

As far as the description has progressed it will be apparent that the block 9 is movable longitudinally through its guide, and that the guide 13 is pivotally supported in the box. Thus the lever 2 can be shifted to any of its desired positions, and the block 9 and its guide are arranged at a central longitudinal position in the box when the lever 2 is swung to reverse position.

The block 9, adjacent to the rear end thereof, has a square opening 18 therethrough, and secured to the sides of the box, directly over the mentioned rear portion of the block, and the guide therefor, there is a transverse brace 19 which has its ends fixedly secured to the sides of the box 3. The brace 19 has a square opening 20 therethrough designed to be arranged opposite the opening 18 in the block 9, when the block has been influenced by the shifting of the lever 2 to bring the gears of the automobile to a position to reverse the travel of the machine. The squared opening 20 serves as a guide for the cross sectionally squared end of a bolt 21. The bolt preferably has its outer end thickened, the said bolt being also provided with a round bore having a spiral groove 22 therein. The groove 22 is engaged by spiral threads 23 on a spindle 24 that centrally projects from a revoluble element 25 which is associated with a key operated lock 26, the key for the said lock passing through a key opening in the top of the box 3. By turning the key the threaded spindle 24 will be revolved to cause the bolt 21 to travel downwardly through the guide opening 20 in the brace 19 and enter the opening 18 in the slidable block 9, thus locking the gear shift lever in reverse position. The part 25 of the lock has an annular depression 26' that is received through the sections of an upper transverse brace 27, the ends of the said brace being fixed to the sides of the box.

Fixedly secured to the revoluble element 25 of the lock there is a disc 28 of insulating material. The disc 28 on one of its faces is provided with a spiral groove 29 and in this groove there is received a guide roller 30 that is suitably journaled on a knife switch 31 that provides one of the elements of a circuit breaker. The switch 31 is pivoted, as at 32, to a contact to which is connected one end of the main battery wire for the machine, and the switch is movable to engage with the second contact 33 to which the second end of the main battery wire is connected. When the lock is operated to bring the bolt out of its keeper opening or to non-locking position the disc 28 is turned to influence the knife switch 31 against the contact 33, so that the electric circuit for the automobile will not be interfered with. However, when the lock is operated to bring the bolt 21 into its keeper opening 18 in the block 9 the disc will have turned to the position illustrated in Figure 6 of the drawings, so that the knife switch 31 is swung away from the contact 33 and thereby breaking the electric circuit of the machine. Thus it will be noted that with my improvement I not only lock the gears of the engine in reverse position but break the electric circuit so that the car cannot be used by unauthorized persons. Even should a person wire around the block from battery to the engine they could only run the car in reverse and consequently attract attention. By locking the gears in reverse position the car is insured against damage when left on hills, as the same cannot be made to travel downward and so it is not necessary to apply the brakes when the car is thus parked. The car can be manually moved forwardly as well as rearwardly in case of fire or the like. The car will hold on a hill without brakes when locked when headed in either direction with respect to the hill.

The improvement is extremely simple, and as previously stated may be applied to any type of gear shift automobiles and while it is thought that the foregoing description, when read in connection with the accompanying drawings, will clearly set forth the construction and operation of the embodiment of the improvement herein set forth, I desire it understood that I hold myself entitled to make such changes and modifications therefrom as fairly fall within the scope of what I claim.

Having described the invention, I claim:—

1. The combination with a gear shift type of automobile, including a gear shift lever therefor, of a means for locking the lever when the same is moved to shift the gears in reverse position, said means including a longitudinally movable block, a swingable guide for the block and a key operated bolt for engaging the block when the latter has been moved by the lever or the latter is brought to reverse position.

2. The combination with a gear shift type of automobile, including the electric system therefor and the gear shift lever, of a block loosely connected to the gear shift lever, a pivotally supported guide through which the block is movable, a lock including a revoluble element, a bolt influenced by the turning of said element to engage the block when the gear shift lever has influenced the said block by its movement to reverse position, contacts to which the ends of a battery wire for an electric circuit are connected, and a knife switch pivoted to one contact and engageable with the other and influenced by the revoluble element to make or break the circuit in accordance with the position of the bolt in its unlocking or in its locking positions.

3. The combination with an automobile of the gear shift type, including the electric circuit therefor and the gear shift lever, of a block removably and loosely connected to the lever, said block having outstanding tongues on the sides thereof, a guide for the block having grooves on the confronting sides thereof in which the tongues of the block are received, a pivoted support for the guide, a bolt, guide means therefor, a key operated lock having a spindle extension threaded for coengagement with the bolt, said block having a keeper opening into which the bolt is movable when the block is operated and a circuit breaker for the electric circuit of the machine operable by the turning of the spindle when the bolt is moved to locking position.

4. The combination with a gear shift type of automobile, including the electric system therefor and the gear shift lever, of a longitudinally movable block loosely connected with the lever, said block having a bolt receiving opening therethrough, a pivotally supported guide for the block, a bolt arranged above the block, guide means for the bolt, said bolt having a bore provided with a spiral groove, a key operated lock including a spindle having spiral threads received in the bore of the bolt and said spindle having a spiral thread to engage in the grooves of the bolt, the opening in the block designed to be brought opposite the bolt when the said block is moved longitudinally by the shifting of the lever to a reverse position, whereby the bolt may be brought into the opening only when the lever is so shifted and means actuated by the turning of the spindle for breaking an electric circuit when the bolt is in locking position.

5. The combination with a gear shift type of automobile, including the gear shift housing, the gear shift lever and the electric system of the automobile, of a means for locking the automobile when the lever has been shifted to reverse position, including a box extending from the gear shift housing, a block in said extension, movable into the housing and removably and loosely connected to the lever, a pivotally supported guide in the housing for the block and said block having a keeper opening therethrough, a bolt guided above the block, said bolt having a spirally grooved bore, a key operated lock supported in the box and having a revoluble part formed with a spindle extension to be received in the bore of the bolt and said spindle having a spiral thread to engage in the groove of the bolt, a disc of insulating material fixed on the revoluble element of the lock and having a spiral groove in one face thereof, contacts to which the respective ends of the main battery wire of the automobile are connected and arranged at the opposite sides of the disc, a switch blade pivoted to one of said contacts and a lower element on the blade received in the groove of the disc, all as and for the purpose specified.

In testimony whereof I affix my signature.

LEELAND F. BROWN.